(12) United States Patent
Bendell et al.

(10) Patent No.: US 11,509,740 B2
(45) Date of Patent: Nov. 22, 2022

(54) SYSTEMS AND METHOD FOR CACHE KEY COMPOSITION CREATION AND DISTRIBUTION

(71) Applicant: Cloudinary Ltd., Petah Tikva (IL)

(72) Inventors: Colin Bendell, Ottawa (CA); Itai Benari, Tel Aviv (IL)

(73) Assignee: Cloudinary Ltd., Petah Tikva (IL)

( * ) Notice: Subject to any disclaimer, the term of this patent is extended or adjusted under 35 U.S.C. 154(b) by 275 days.

(21) Appl. No.: 16/729,685

(22) Filed: Dec. 30, 2019

(65) Prior Publication Data

US 2020/0344316 A1 Oct. 29, 2020

Related U.S. Application Data

(60) Provisional application No. 62/840,078, filed on Apr. 29, 2019.

(51) Int. Cl.
| | |
|---|---|
| *H04L 67/568* | (2022.01) |
| *H04L 69/329* | (2022.01) |
| *H04L 67/02* | (2022.01) |
| *H04L 67/01* | (2022.01) |
| *H04L 67/52* | (2022.01) |

(52) U.S. Cl.
CPC ............ *H04L 67/568* (2022.05); *H04L 67/01* (2022.05); *H04L 67/02* (2013.01); *H04L 67/52* (2022.05); *H04L 69/329* (2013.01)

(58) Field of Classification Search
CPC ........ H04L 67/00–67/42; H04L 69/32–69/329
See application file for complete search history.

(56) References Cited

U.S. PATENT DOCUMENTS

| | | | | |
|---|---|---|---|---|
| 2008/0320225 | A1* | 12/2008 | Panzer | G06F 16/972 711/E12.017 |
| 2013/0138763 | A1* | 5/2013 | Panzer | H04L 67/10 709/213 |
| 2014/0258375 | A1* | 9/2014 | Munoz | H04L 67/2847 709/203 |
| 2017/0078433 | A1* | 3/2017 | Radhakrishnan | H04L 67/327 |
| 2018/0198762 | A1* | 7/2018 | Cline | H04L 63/0428 |
| 2018/0278688 | A1* | 9/2018 | Gal | H04L 67/32 |

\* cited by examiner

*Primary Examiner* — Clayton R Williams
(74) *Attorney, Agent, or Firm* — Phillips Lytle LLP; David L. Principe

(57) ABSTRACT

There is disclosed herein computer implemented methods of cache key generation including receiving from a user a request for content; wherein the request comprises one or more of opening a browser software tab or window, launching a software application, activating a hyperlink; wherein the request causes an electronic communications network connection to be established and/or an HTTP request made; and wherein, the surrogate passes the request to an origin.

20 Claims, 4 Drawing Sheets

SYSTEMS AND METHOD FOR CACHE KEY COMPOSITION CREATION AND DISTRIBUTION

CROSS-REFERENCE TO RELATED APPLICATION

The present application claims priority to U.S. Provisional Patent Application No. 62/840,078 filed, Apr. 29, 2019, the contents of which are hereby incorporated herein in their entirety.

BACKGROUND

It is known to employ HTTP caches and Content Delivery Networks (CDN) aimed at increasing quality and duration of user experience for content and access thereto on the internet. Aspects of quality include presentation of content on the particular device of a particular user, such as display of images and video content, as well as speed of delivery thereof and adaptation of delivery in an optimized manner in a given scenario. It is understood in the field that higher quality and speed of content delivery and presentation encourages prolonged use of a given source of content. Prolonged use increases user uptake of a given content source (which may include sources through which products are made available for use, lease and/or purchase).

Known methods and systems of optimization include creating a cache-key for each user request for content and then re-using the response for requests that are similar in terms of related HTTP. Typically, these types of approaches use the URL related to the user, but can be augmented with other attributes including, for example and without limitation, user and/or request source data such as the kind of browser, kind of device, data stored or acquired as "cookies," request location, network timing, bot and CDN identification, geography (user, server and other pertinent locations), low-power mode preferences and performance, and save-date opt-in notifications.

Responsive Web Design (RWD) and Adaptive Web Design (AWD) are techniques that may be used to improve user experience as relates to receipt of content on electronic devices (e.g., desktops, laptops, tablets, wearables, phones of other handheld devices), to provide and/or modify the content to a specific user or situation. User attributes such as, for example and without limitation, browser kind, screen size and other attributes such as device pixel ratio (DPR), device rotation/orientation, low-power or other function attenuation settings, and pre-existing cache existence/properties, are used to optimize the response.

In effect, a single response becomes fragmented into 100s of 'similar' but tuned responses for different classes/types of users. As an example, in the context of images and video this means an image with different pixel dimensions (e.g., 100×200 and 50×100), different crops (crop to a shown person's face on a small display, zoom out a bit if on a big display), and different quality settings, or other user-specific traits may be provided based on user data (to speed and otherwise improve user experience).

This fragmentation of 1 source piece of content to 100s of derivatives creates cache fragmentation. There is generally optimal performance on a cache or CDN for popular combinations (for example and without limitation, each cdn may have a different algorithm, balancing of disk space, index size, and computation cost as relates to travel dense indexes, and more combinations may cause a longer tail of popularity) whereas less popular combinations drop from the least recently used (LRU) cache.

A negative result of employing such systems and methods is increased incidence of cache-misses and/or possible re-generation of these derivatives. That is, responses tailored for a popular communications device (e.g., iPhone X™, iPhone XS and related devices in 2018) is always cached and fast, whereas responses for less commonly used devices (e.g., BlackBerry Bold™ in 2018) may more often be cache-misses. Cache misses delay and diminish quality of user experience, which is highly correlated with abandonment rates (i.e., users not using the given service, not recommending it to others either directly or via social media; users instead in some cases creating negative reviews in online forums and environments). In sales environments, cache misses effectively increase costs of goods sold (cogs) via at least internet exchange (IX), transit and cpu usages costs for re-generation (in addition to any loss of or failure to generate additional sales).

It is also generally known in the field to create layers of caches to offset re-generation, with known methods including steps such as but not limited to: (i) a database call to collect current prices is cached at the db, (ii) the search results will cache the search term to db call collection, (iii) the html markup being cached with dependencies for each module, and (iv) the output html markup is finally cached by load balancers and cdns; but, such approaches are fundamentally LRU-based and popularity (of a given trait or traits) or "noisy neighbors" phenomena (i.e., disproportionate users of bandwidth and other resources whose results will effectively be overrepresented in terms of being indicative of general marketplace trends) will push this content out, diminishing effectiveness and user experience in respect of less-popular cache criteria. While such criteria are less popular, volumes of users displaying such criteria are nonetheless significant based on overall market size. For example, device fragmentation is increasing, and popularity various with geography, such that if sharing parent caches, the popularity on one continent will have an inverse impact on the popularity on another continent.

It is also known to use pre-generation to pre-populate caches—either inbound (first person through the door causes 100s of permutations to be simultaneously generated) or out of band (queue is created). All variations must have a pre-defined 'contract' to which combination attributes can be used, in that one needs to know in advance how many permutations are needed or what the permutation terms are. Iphone and android (e.g., landscape vs. portrait orientation, etc.). This issue may manifest in delays for users exhibiting less popular trait variations, with such delays meaning either slow and/or otherwise ineffective delivery of content.

Due to reliance on pre-defined rules, the assumed set will always be 'n' variations which can cause further cache pollution if there are combinations that share the same result (e.g., different communications devices could actually have the same response and share the same cache key for a specific image; but, the pre-defined rule yields a different result based on an assumption that such disparate devices would provide different responses).

As such, there is a need for improved systems and methods of cache-key generation.

BRIEF SUMMARY

There is disclosed herein systems for and methods of just-in-time cache key composition creation and distribution.

There is herein disclosed a computer implemented method of cache key generation. The method includes receiving from a user a request for content (comprising one or more of opening a browser software tab or window, launching a software application, activating a hyperlink), with the request causing an electronic communications network connection to be established and/or an HTTP request made; and, with the surrogate passing the request to an origin.

In another disclosed aspect, the method further including the origin generating and sending a response to the surrogate wherein the response comprises indicating whether or not the content is one of a plurality of variations thereof based on n dimensions of variation of the content.

In another disclosed aspect, the method further including a comparison prior to the generating, the comparison comprising examinations of one or more user traits comprising geographic location, software used to make the request, device used to make the request, absolute time of the request, relative time of the request.

In another disclosed aspect, the user traits comprise geographic location comprising the location from where the request was made.

In another disclosed aspect, the user traits comprise software used to make the request, wherein the software comprises the operating system of a mobile computing device.

In another disclosed aspect, the user traits comprise the absolute time of the request.

In another disclosed aspect, the user traits comprise the relative time of the request wherein the relative time is assessed in relation to timing relative to an event.

In another disclosed aspect, the electronic communications network comprises a cellular communications network.

In another disclosed aspect, the response comprises all of the variations

In another disclosed aspect, the response comprises a single variation of the content wherein the content is optimized for the user.

In another disclosed aspect, the method further comprises a second user initiating a second request for second content.

In another disclosed aspect, the method further comprises registering a cache hit for overlap in examined traits of a second user making the second request and the first request.

In another disclosed aspect, the first and second request are from the same user.

In another disclosed aspect, the method further comprises comparing the user traits to known traits and providing a version of the content to the user based on a result of the comparing.

In another disclosed aspect, the version comprises a stock version of the content.

In another disclosed aspect, the version comprises a custom version of the content for the user.

In another disclosed aspect, substantially at the transmission to the end user the variation of the content is extracted.

In another disclosed aspect, the method further comprises generating a cache comprising multiple layers wherein between each of the layers there is a passive contract to accommodate variations, wherein each layer comprises one or more variations and wherein each variation comprises one or more rules wherein each rule relates to handling of one or more of the user traits.

In another disclosed aspect, if the result of the comparison is not an overlap between the user traits and the trait set, the content will be generated based on an approximation of user needs.

There is also disclosed herein computer readable media containing instructions for performing the steps of the methods described herein and above.

There is also disclosed herein non-transitory computer-readable storage medium containing instructions for causing a processor to perform the steps of the methods described herein and above.

There is also disclosed herein a computer-implemented system arranged to perform the methods described herein and above.

There is also disclosed herein a computer implemented method of content handling, the method comprising: receiving a request for content from the user at a surrogate; passing the request from the surrogate to an authority; providing a response from the authority to the surrogate comprising details of: how many variations of the content are known to the surrogate; and whether or not content for the user is one of the variations; origin responds with either all of the variations, or only the response for the waiting-user and provides placeholders for the surrogate to fill in later; surrogate provides to user the determined version of the content; receiving a second request for content from a second user at the surrogate; generating a cache hit.

DETAILED DESCRIPTION

Figure 1:
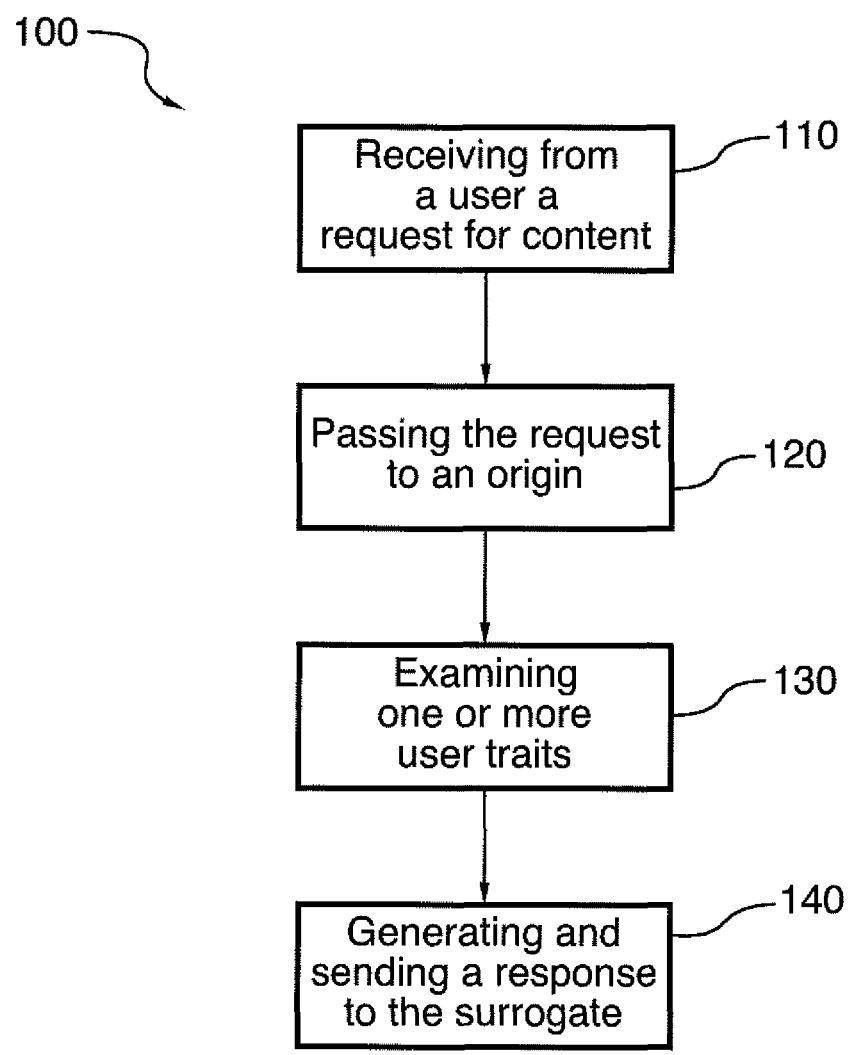
FIG. 1 is a flow chart showing steps of a method disclosed herein.
Figure 2:
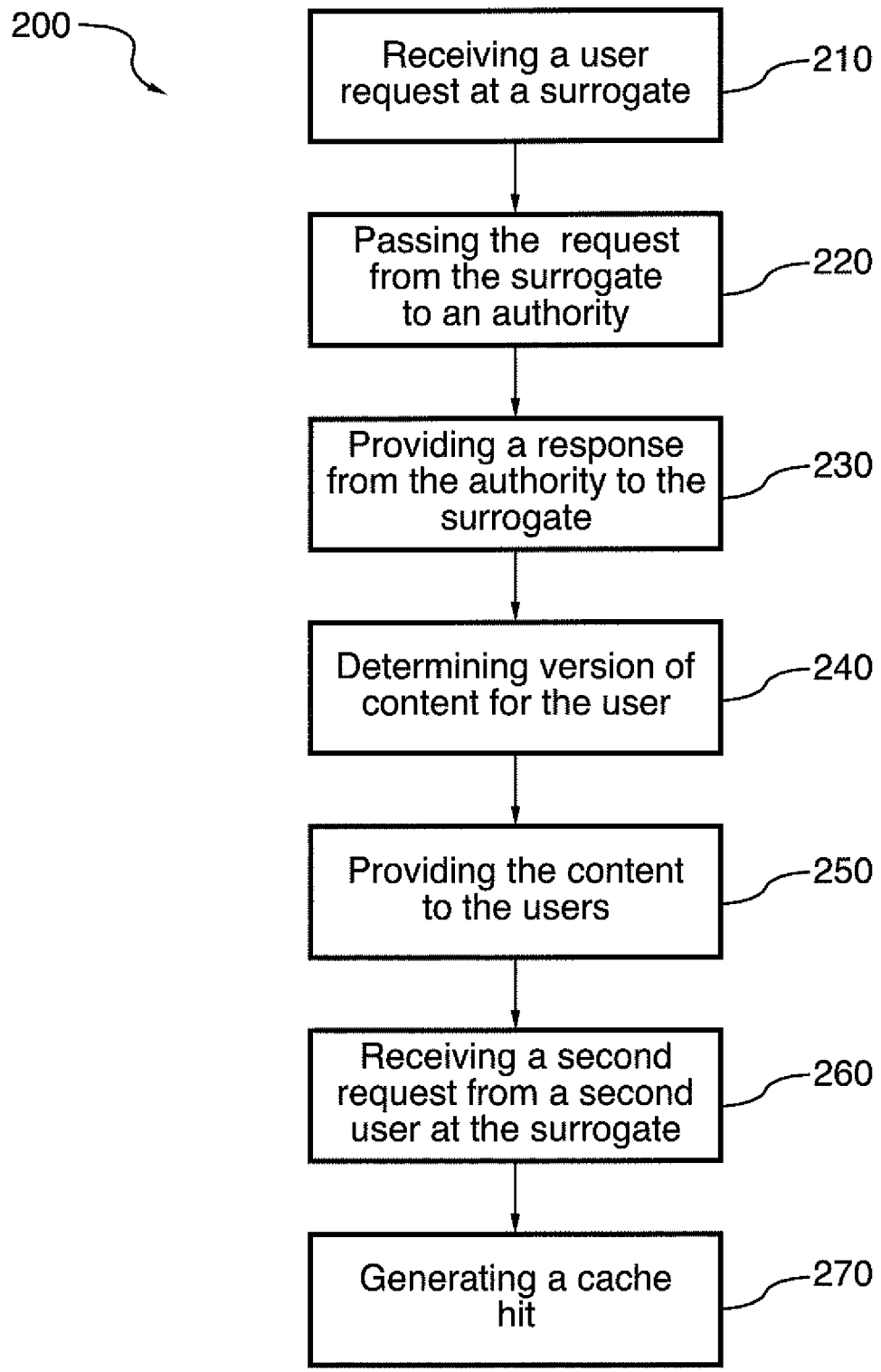
FIG. 2 is a flow chart showing steps of a further method disclosed herein.

There is disclosed herein computer implemented methods of cache key generation (100, 200 in FIGS. 1 and 2, respectively). A first exemplary method 100 shown in FIG. 1 receiving 110 from a user a request for content. The request may include one or more of opening a browser software tab or window, launching a software application, and/or activating a hyperlink. The request's receipt causes an electronic communications network connection to be established and/or an HTTP request to be made. The surrogate then passes 120 the request to an origin. The origin examines 130 one or more user traits and generates and sends 140 a response to the surrogate, including indicating whether or not the content is one of a plurality of variations thereof based on n dimensions of variation of the content. The response may include all of the variations or a single variation of the content optimized for the user.

The method 100 may also include a second user initiating a second request for second content, with the first and second request in some embodiments being from the same user. The method 100 may also include registering a cache hit for overlap in examined traits of a second user making the second request and the first request.

The method 100 may further include a comparison prior to the generating, with the comparison comprising examinations of one or more user traits such as, for example, geographic location, software used to make the request, device used to make the request, absolute time of the request, and/or relative time of the request. In some embodiments, the user traits may preferably comprise geographic location comprising the location from where the request was made. In other embodiments, the traits may comprise software used to make the request, and the software may be the operating system of, for example, a mobile computing device. In some embodiments, the electronic communications network may comprise a cellular communications network. The method may also include comparing the user traits to known traits and providing a version of the content to the user based on a result of the comparing, which version may be a stock or custom version of the content depending on the result. Where the result of the comparison is not an overlap between the user traits and the trait set, the content will be generated based on an approximation of user needs. In some embodiments, it is substantially at the transmission to the end user that the variation of the content is extracted.

The method may also include generating a cache comprising multiple layers wherein between each of the layers there is a passive contract to accommodate variations, wherein each layer comprises one or more variations and wherein each variation comprises one or more rules wherein each rule relates to handling of one or more of the user traits.

Looking more specifically to FIG. 2, there is also disclosed herein a computer implemented method 200 of content handling, including the steps of receiving 210 a request for content from the user at a surrogate; passing 220 the request from the surrogate to an authority; providing 230 a response from the authority to the surrogate comprising details of: how many variations of the content are known to the surrogate; and whether or not content for the user is one of the variations; origin responds with either all of the variations, or only the response for the waiting-user and provides placeholders for the surrogate to fill in later; surrogate provides 250 to user the determined version of the content; receiving 260 a second request for content from a second user at the surrogate; generating 270 a cache hit.

One skilled in the art will appreciate that there may be provided computer readable media or non-transitory computer-readable storage medium containing instructions for performing the steps of method disclosed herein. Further, computer-implemented systems may be provided in arrangements suitable to perform the method disclosed herein.

Figure 3:
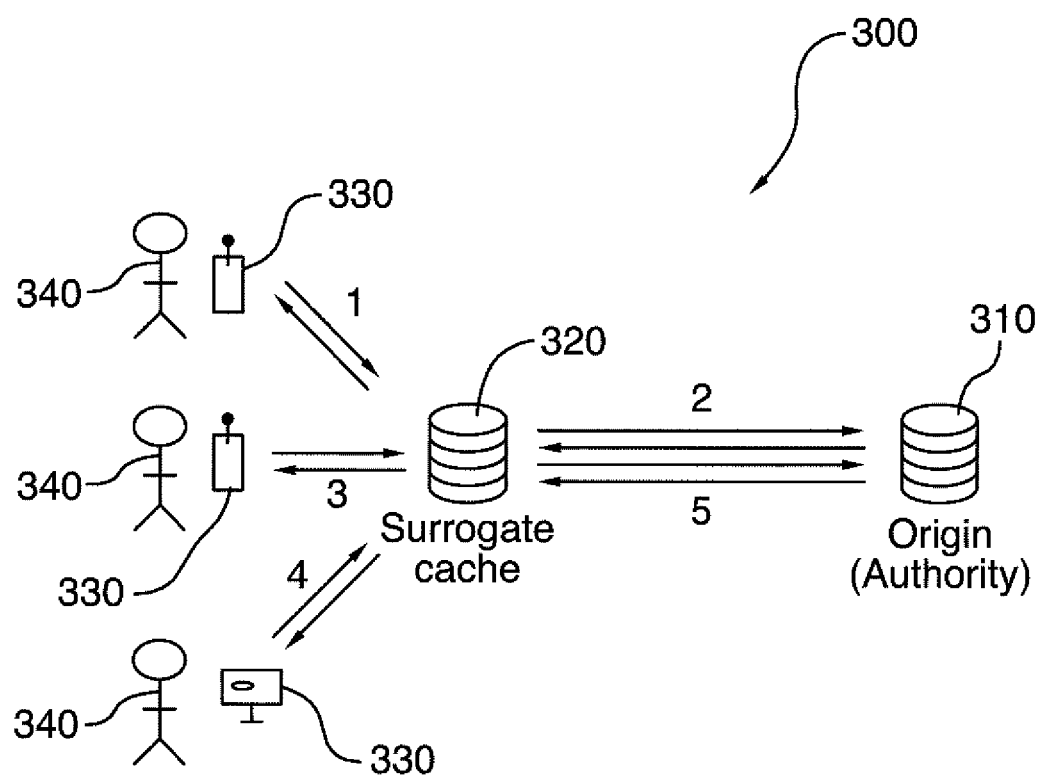
FIG. 3 is a schematic representation of systems disclosed herein.
Figure 4:
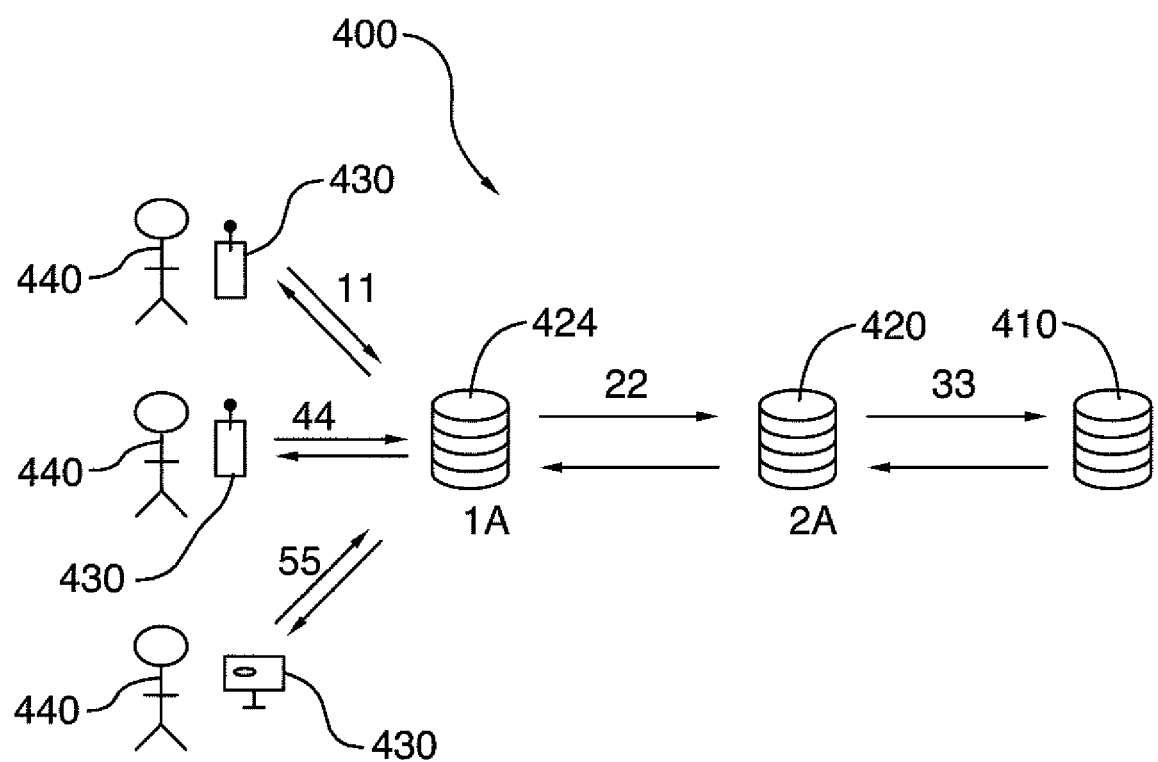
FIG. 4 is a schematic representation of further systems disclosed herein.

The methods and systems disclosed herein are also shown in schematic format in FIGS. 3-4. The system shown in FIG. 3 has events occurring in the sequence 1-2-3-4-5. In FIG. 4 events occur in the sequence 11-22-33-44-55. One skilled in the art will appreciate that FIGS. 3-4 are but example variations of orders of requests and content provision steps intended to illustrate potential data flow scenarios.

The disclosed systems 300, 400 and methods 100, 200 include variations wherein all user or query source variations share the same cache key and are moved through caches together. In such approaches, the least popular variant shares substantially the cache popularity of the most popular variant. Only substantially at the point of final transmission to the end user is the specific variation extracted to such user for the purposes of customizing content to such user whilst minimizing chances of mischaracterizing the user. Again, sample schematic illustrations of disclosed systems are shown in FIGS. 3 and 4.

Layers of caches and a specific "handshake" between the layers allows for passive contracts for variations. In this manner, the cache only "learns" of the variations and the attributes for the cache later, providing an optimal yield of variations. For example, response A could contain 5 variations with rules about attributes to include while response B could contain 10 variations with different rules.

In the event of a cache miss, the end user is nevertheless served immediately while providing placeholder hints (e.g., an empty placeholder with indexes that are not yet populated; the overall permutation may be calculated early, but the actual details are provided later to the cache layers of the pending gaps in the variations.

If a user initiates a request, and cache misses, the origin generates a specific response for the specific user and immediately services the waiting user. In the response to the cache, the origin also informs that there are 'n' parallel variations that will be populated out of band. As such, when another user arrives and requests one of the new variations, the cache will not have a cache hit, so as to avoid falsely over representing a certain result.

There are provided in the disclosed systems computer processing means suitably powered and instructed to create and retain a defined 'surrogate' handshake for cache negotiation of capabilities and responses. This allows for caches that could be out of systemic, immediate control to contribute to and benefit from the cache archive composition. In some disclosed embodiments, variations are generated to accommodate a broad array of possible users whilst optimizing speed and quality of delivery.

In some embodiments, disclosed methods include the following steps:
  (a) a user initiates a request (which may include, for example, opening a browser tab, launching an application, which causes a cellular/network connection to be established and/or an HTTP request made;
  (b) a surrogate passes the request along to an authority (origin);
  (c) origin responds and indicates to the surrogate that this is one of many variations of the same content based on n dimensions of variation;
  (d) origin responds with the either all of the variations, or only the response for the waiting-user and provides placeholders for the surrogate to fill in later (e.g., based on knowledge about the asset, a rubric is applied to determine what the likely Cartesian product will look like. Later, these indexes can be reduced);
  (e) user receives just the single variation that is optimized for the experience;
  (f) second user initiates a request;
  (g) instead of a cache miss, it is a cache hit because of the provided rules and variations (e.g., in cases of, without limitation, same kind of webpage visited, but with a different browser, device, etc.)

One skilled in the art will appreciate that the particular order and number of steps may be optimized to maximize effectiveness of processes for waiting users while generating variations to assist in optimizing processes for similar users.

The disclosed systems and methods are designed to "fail open" and behave either as though there were no-cache or as a dumb cache with fragmentation of the cache keys. For example and without limitation, any removal or omission of the handshake between surrogate and the origin would typically result in a fail-open scenario.

There are disclosed herein mechanisms to communicate Cache Variants from a common URI stem. This allows CDNs to learn late that multiple cache keys exist and possibly even participate in distributing the variants as part of a combined archive (referred to in the field as "tar" in homage to the tarball). There is provided in Appendix A hereto a description of a sample definition of a specific contract for variant definition, and a sample definition of the specific contract for Variant Tar. Appended content refers generally to examples of providing image content to a user; however, one skilled in the art will appreciate that the disclosed systems and methods are not so limited to a particular medium, data or content type, be it in terms applicability or function.

Disclosed systems and methods are aimed at least to: (i) improving user experience by increasing the CDN cache yield (cache-hit-rate) and reducing the number of requests to the origin; (ii) increasing the determinism of the cache key in situations where the variations are not known at request time (e.g., whether there is a web version or just a .jpg file type version available in the context of images); (iii) reducing COGS for variant generation; (iv) increasing adoption of differentiation features (e.g., variant creation such as w_auto and f_auto, without unduly increasing customer costs; (v) creating new variations and use cases with a known design and architecture.

As discussed in Appendix A, each "hop" in the "chain" of a request should not assume the requesting surrogate can handle advanced features but should instead communicate different capabilities and levels of pre-shared contract definitions to the surrogate by sending a 'Surrogate-Capability' request/query to initiate the handshake. 'Surrogate-Capability', like 'Client-Hints' and 'Accept' headers, it tells the origin what advanced features could be handled at a given layer. In any specific case, there will be provided an indication to the next hop in the chain those features that the surrogate can support (e.g., 'Surrogate-Variant' 'Surrogate-Tar', 'Surrogate-ACL' features).

In disclosed embodiments, some of the interpretation of variant partitioning depends on a nuanced set of business logic, such that there may be versions or other characteristic subsets to the 'Surrogate-Capability' trait. To indicate that the origin could respond with 'Surrogate-Variant' responses, the request would contain 'Surrogate-Capability: variant'. There may also be provided a list of possible values that could be added to the cache key and supported by the given surrogate, which attributes may map to HTTP headers found on the request. Generally, opt-in may be assumed, but it is up to the implementation to decide. That is, if 'variant; content-encoding' is missing, the origin should assume that the surrogate can handle 'Content-Encoding: gzip' and 'Content-Encoding: br' as variants unless explicitly told so. There is no guarantee of success based on such an assumption, such that it should be assumed the surrogate cannot add arbitrary variations unless it is explicitly enumerated in the 'Surrogate-Capability' (although capabilities such as Content-Encoding may be exceptions since this is a staple of the HTTP stack). It will be appreciated that the list of variant headers is only a hint. It does not indicate to the origin a formal contract. The origin will define the contract in as much as the surrogate can comply.

To reduce the possibility of corruption or miscommunication, when variants are used, the last hop (generally the origin application) should assume that the response is not cacheable by other surrogates and the response is only to be consumed by the end user. That is, if a request is made for, for example, a Chrome browser user with f_auto, the origin should assume that the surrogate cannot decode valid Chrome entities and therefore disable CDN caching (e.g., by producing the necessary cache-busting surrogate headers). An aim of this disclosed aspect is to avoid cache collisions. It is, however, advantageous in some embodiments to hint that the 'Surrogate-Variant' could have occurred as this will allow the particular Surrogate to identify and adapt.

Some variants may be based on business logic, and require a Surrogate to communicate these custom values as HTTP headers; but, it is up to the origin to decide whether the surrogate conforms sufficiently. For example, to communicate non-standard variants like RTT or browser-format lists, or TLS ciphers, the surrogate should add these items as headers, preferably prefixed with 'X-'. This can allow the Surrogate to add 'X-Client-RTT: 122', 'X-Client-TLS: EDCHA' or 'X-Browser-Formats: webp; q=0.8, jpg, png, gif' as specific values as request headers. It is up to the origin to accept these custom headers and to trust the surrogate to derive these headers correctly. The origin also functions to decide whether the surrogate can properly deduce the logic that applies to a value. It is in some embodiments preferable to employ a good, generally non-colliding header for such cases. In coded implementations, for example, standard RFC5234 formatting of these custom header values should be applied (including, for example, colloquial use of ';q=' for priority).

A sibling capability is understood to be a 'tar'. This indicates that the surrogate can handle a response containing all the variants in one response. This is useful to eliminate cache fragmentation, allows for popularity pull through, and reduces future round trips (e.g., allows n:1 requests instead of n:n).

A 'Surrogate-Variant' may be composed of, for example, axis and values, particularly in the context of images. For example, a response that uses the 'width' request header could reply with content indicative of however many variations there are of the queried resource. For example, there could be image width entries of 201 pixels, 400 and 1000 pixels. The surrogate must then decide when to select one of those 3 entries. It will be appreciated that it is important to have a clear out of band contract defined for interpretation purposes. Should a value of width=300 then select the 400 or the 201 response? If unable to make a certain determination, the origin should not accept the surrogate-capability. In making determinations, the origin will determine total variants.

When expanding a multi axis variant, the order is preferably deterministic. This is of particular importance when using the surrogate-tar feature. Likewise for performance reasons the origin should arrange the multi axis variants to exploit the cross multiplication determinism.

A surrogate should therefore expand the variants consistently from left to right. For example:

| Key | Expansion |
| --- | --- |
| '[a, b]' | 'ax' |
| '[a, b][x, y]' | '[ax, ay, bx, by]' |
| '[a, b, c][l, m, n][x, y]' | '[alx, aly, amx, amy . . . cnx, cny]' |

The origin should also order the values and keys (when expansion occurs) for performance and default purposes. Unlike the accept header, the order or variant values do not matter and value should not be assumed. The natural order might be to put the values of variants in ascending order. However if the origin knows that one variant might be more popular, it would be advantageous to place that entry at the beginning. Likewise the origin should exploit the expansion order to better match popularity. Ordering might also be considered for 'Surrogate-Tar' to reduce the risk in a failure state. Specifically if the 'Surrogate-Tar' handshake fails and a client is given the complete archive. In this situation placing a broadly consumed sequence at the beginning might be advantageous.

While 'Surrogate-Variant' identifies the key composition and valid entries, the 'Surrogate-Variant-Key' identifies the current response values used. The key values might be very different than the actual values sent in the request. Combined, the 'Surrogate-Variant' and 'Surrogate-Variant-Key' response provide two important instructions:

1. How this response could satisfy the waiting UA
2. How future requests should be formed to extract specific variant responses In instances of imprecise requests from the surrogate, a request-value and variant-key mismatch can provide a dilemma for the surrogate if the business logic contract is not consistent. The response from the origin may not be the desired partition sent to the user. The origin may provide a default response when an imprecise initial request is made by the surrogate. It is important that the Surrogate re-evaluate before assuming that the origin's response is intended for the UA.

Most surrogate caches are not able to build a cache entry passively—one response at a time (e.g., with range-requests) Therefore, each variant must be assumed as a separate cache entry. The response from the origin, can be detected by the imprecision of the request.

On a first response in the Surrogate-Variant handshake (specifically when imprecision is detected), the origin may respond with the safest response. The origin may choose to use the probability of the variants and provide the highest popularity response as the first response. This mismatch is because most surrogates will have to restart the request flow even on a cache hit. The origin may assume that the request flow will always be: To avoid the re-entrant nature for the 'majority' of requests, the origin may populate the 1st response with the most popular.

This will force the Surrogate to evaluate the response as a mismatch and re-request the resource. This time as a more precise entry. As mentioned, the response (from the origin, or from the cache) may not match the request. This can happen in, for example, two scenarios:

1. The response has been recalibrated. (Eg: User requested a 'Width: 250' but a 'Width: 400' is the recalibration)
2. The response is not for this UA, but a more popular UA.

The surrogate must evaluate the mismatch and determine which of the two scenarios is applicable. If a recalibration, no further processing is required. However, if it is an actual mismatch a restart should be initiated by the surrogate. With most surrogates, unless they are using the 'Surrogate-Tar', it is assumed that most responses will require at least one restart. Therefore it is also important for the origin to evaluate the performance offset of a restart compared to a full cache miss. Some CDNs and Surrogates might have a high cost for a restart in the request flow. In a typical scenario the restart should occur when the variant-hit (from cache or from origin) doesn't match the request. When this happens, the flow will typically be restarted by the surrogate—this time with precise values of the variant key. In this way, no further business logic will be necessary. However, in the event of a cache miss or error on the second request, the surrogate can optionally send a 404 to the waiting UA or restart once again and this time use the default response provided originally. This is why it is important that the default response in a Surrogate-Variant handshake be a widely acceptable response.

There is provided below an illustrative sample Surrogate-Variant definition:

EXAMPLE SURROGATE-VARIANT DEFINITION

```
# Surrogate-Variant, Surrogate-Variant-Key, Surrogate-Tar Explainer
# Overview
Application defined mechanism to communicate Cache Variants from a common URI
stem. This allows CDNs to learn late that multiple cache keys exist and possibly even
participate in distributing the variants as part of a combined archive (colloquially called
tar-homage to the tarball)
Basic Usage with Variant & Key
...
GET/foo HTTP/1.1
Surrogate-Capability: variant;Width;Accept;X-Browser
Accept: */*, image/webp, video/mp4
Width: 250
X-Browser: webp, jpg
...
200 OK HTTP/1.1
Surrogate-Variant: Width;201;400;1000, X-Browser;webp;jp2;jxr;jpg;png;gif
Surrogate-Variant-Key: 201, jpg
Content-Type: image/jpg
...
Expanded Usage with Tar:
...
GET/foo HTTP/1.1
Surrogate-Capability: variant;Width;Accept;X-Browser, tar
Accept: */*, image/webp, video/mp4
Width: 250
X-Browser: webp, jpg
...
200 OK HTTP/1.1
Surrogate-Variant: Width;201;400;1000, X-Browser;webp,jp2;jxr;jpg;png;gif
Surrogate-Tar: 0:201, jpg
Content-Type: image/jpg
...
# Use Cases
1. It may be operationally advantageous in some embodiments to improve user
experiences by increasing the CDN cache yield (cache-hit-rate) and reduce the number
of requests to the origin.
```

| EXAMPLE SURROGATE-VARIANT DEFINITION |
| --- |

2. It may be operationally advantageous to increase the determinism of the cache key in situations where the variations are not known at request time. For example, whether there is a webp version or just a jpg version available and/or what breakpoints should be used.
3. It may be advantageous in some embodiments to reduce my COGS for variant generation to S3. Fr example, this may include reducing the long tail cache-misses that cause S3 requests and the 'n' PUT/POST to S3.
Surrogate Handshake
Each hop in the chain of the request may preferably not assume the requesting surrogate can handle advanced features. To communicate different capabilities and levels of pre-shared contract definitions the surrogate may preferably send a 'Surrogate-Capability'to initiate the handshake.
The 'Surrogate-Capability', like 'Client-Hints' and 'Accept' headers, it tells the origin what advanced features_could_be handled at this layer. The feature list is in RFC5234 formatting.
User request:
. . .
GET /foo HTTP/1.1
User-Agent: Mozilla/4.0 (compatible)
. . .
CDN (Surrogate) request:
. . .
GET /foo HTTP/1.1
User-Agent: Mozilla/4.0 (compatible)
Surrogate-Capability: variant;Width;X-Browser, tar, acl;token;ip
. . .
For the above example, this indicates to the next hop in the chain that the surrogate can support 'Surrogate-Variant' 'Surrogate-Tar', 'Surrogate-ACL' features.
In this situation the specific capabilities use are 'variant' and 'tar'.
Business logic & contract version
Since some of the interpretation of the variant partitioning depends on a nuanced set of business logic, it may also in some embodiments be advantageous for the surrogate to implement a 'version' as part of the 'Surrogate-Capability'.
. . .
Surrogate-Capability: cloudinary;1.4
. . .
*TODO*
'Surrogate-Capability: variant'
To indicate that the origin could respond with 'Surrogate-Variant' responses, the request may contain 'Surrogate-Capability: variant'. What follows is a list of example values that could be added to the cache key and supported by the surrogate. These attributes map to HTTP headers found on the request.
. . .
GET /foo HTTP/1.1
User-Agent: Mozilla/4.0 (compatible)
Surrogate-Capability: variant;Width;X-Browser;X-RTT
Width: 401
Surrogate-Variant: Width;201;400;1000, X-Browser;webp;jp2;jxr;jpg;png;gif
Surrogate-Variant-Key: 201, jpg
. . .
Fail "open"
To reduce the possibility of corruption or miscommunication, when variants are used, the last hop (generally the Origin application) may in some embodiments assume that the response is not cacheable by other surrogates and the response is only to be consumed by the end user. That is, if a request is made for a Chrome user with f_auto, the origin may in some cases assume that the surrogate doesn't know how to decode valid Chrome entities and therefore disable CDN caching. (By producing the necessary cache-busting surrogate headers)
. . .
GET /foo HTTP/1.1
User-Agent: Mozilla/4.0 (compatible)
Surrogate-Capability: variant;Content-Ecoding, acl
Width: 401
. . .
200 OK HTTP/1.1
Surrogate-Cache: no-store
Content-Type: image/jpg
Surrogate-Variant: Width;201;400;1000
Surrogate-Variant-Key: 400
. . .
This way the surrogate preferably will not have a situation where there are cache collisions.
It is still good practice to hint that the 'Surrogate-Variant' could have occurred as this will may facilitate the Surrogate identifying and adapting.

| EXAMPLE SURROGATE-VARIANT DEFINITION |
| --- |
| ## Non standard HTTP headers
As discussed below, some variants are based on business logic. A Surrogate must communicate these custom values as HTTP headers but it is up to the origin to decide whether the surrogate conforms sufficiently.
For example, to communicate non-standard variants like RTT or browser-format lists, or TLS ciphers, the surrogate may preferably add these items as headers, preferably prefixed with 'X-'. This can allow the Surrogate to add 'X-Client-RTT: 122', 'X-Client-TLS: EDCHA' or 'X-Browser-Formats: webp;q=0.8, jpg, png, gif' as specific values as request headers. It is up to the origin to accept these custom headers and to trust the surrogate to derive these headers correctly.
. . .
GET /foo HTTP/1.1
User-Agent: Mozilla/4.0 (compatible)
Surrogate-Capability: variant;Width;X-Browser;X-TLS
X-Browser: webp, svg, png, gif
X-TLS: 122
Width: 401
200 OK HTTP/1.1
Surrogate-Variant: Width;201;400;1000, X-Browser;webp;jp2;jxr;jpg;png;gif
Surrogate-Variant-Key: 400, webp
Content-Type: image/webp
. . .
It is also up to the origin to decide whether the surrogate can properly deduce the logic that applies to a value. This is why a good, generally non-colliding header may preferably be used for these cases (eg: Don't use 'X-Forwarded-For' for custom business logic values).
Standard RFC5234 formatting of these custom header values may preferably be applied. (Including the colloquial use of ';q=' for priority)
'Surrogate-Capability: tar'
A sibling capability is 'tar'. This indicates that the surrogate can handle a response containing all the variants in one response. This is useful to eliminate cache fragmentation, allows for popularity pull through, and reduces future round trips (allows n:1 requests instead of n:n)
. . .
GET /foo HTTP/1.1
Surrogate-Capability: variant;Width;X-Browser, tar
Width: 250
X-Browser: webp, jpg
. . .
200 OK HTTP/1.1
Surrogate-Variant: Width;201;400, X-Browser;webp;jpg
Surrogate-Tar: a;201;jpg;bytes=0-256, b;201;webp;bytes=257-314 a;400;jpg;bytes=315-522, b;400;webp;bytes=523-799
Content-Type: image/jpg
. . .
'Surrogate-Variant'
Like the proposed 'Variant' intended for the UserAgent, the 'Surrogate-Variant' is composed of axis and values.
For example, a response that uses the 'width' request header could reply back with:
. . .
Surrogate-Variant: Width;201;400;1000
. . .
This indicates that there are 3 main variations of the resource. Specifically, one entry that is 201 pixels, along with 400 and 1000 options.
It is now up to the surrogate to decide when to select one of those 3 entries.
NB: It is important to have a clear out of band contract defined for interpretation purposes. Should a value of width=300 then select the 400 or the 201 response? This is an implementation detail that is outside the scope of this standard. If in doubt, the origin should not accept the surrogate-capability.
Multiple axis keys are likewise comma separated. To specify multiple breakpoints and multiple formats for the response you could indicate:
. . .
Surrogate-Variant: Width;201;400;1000, X-Browser;webp;jp2;jpg
. . .
In this scenario the 3 breakpoints can be combined with 3 different formats resulting in 9 total variants. The derived cache entries are:
* [201, webp]
* [201, jp2]
* [201, jpg]
* [400, webp]
* [400, jp2]
* [400, jpg]
* [1000, webp]
* [1000, jp2]
* [1000, jpg] |

| EXAMPLE SURROGATE-VARIANT DEFINITION |
|---|

Multi-Variant Expansion
When expanding the multi axis variant, the order should be deterministic. This is specifically important when using the surrogate-tar feature. Likewise for performance reasons the origin may preferably arrange the multi axis variants to exploit the cross multiplication determinism.
A surrogate may preferably therefore expand the variants consistently from left to right. For example:

| Key | Expansion |
|---|---|
| '[a, b][x]' | 'ax' |
| '[a,b][x,y]' | '[ax, ay, bx, by]' |
| '[a,b,c][l,m,n][x,y]' | '[alx, aly, amx, amy . . . cnx, cny]' |

In more concrete terms:
. . .
Surrogate-Variant: X-Browser;webp;jpg, Width;400;1000;201
. . .
Expands out in the following order:
1. [webp, 400]
2. [webp, 10000]
3. [webp, 201]
4. [jpg, 400]
5. [jpg, 10000]
6. [jpg, 201]

Variant Ordering
The origin may preferably take care to order the values and keys (when expansion occurs) for performance and default purposes. Unlike the accept header, the order or variant values does not matter and value should not be assumed.
The natural order might be to put the values of variants in ascending order. However if the origin knows that one variant might be more popular, it would be advantageous to place that entry at the beginning. Likewise the origin may preferably exploit the expansion order to better match popularity.
For example, the webp variants are most popular with the breakpoint popularity of 400 then 1000. The jpg 200 is the least popular. In this case the preferred ordering would be:
. . .
Surrogate-Variant: X-Browser;webp;jpg, Width;400;1000,201
. . .
Ordering might also be considered For 'Surrogate-Tar' to reduce the risk in a failure state. Specifically if the 'Surrogate-Tar' handshake fails and a client is given the complete archive. In this situation placing a broadly consumed sequence at the beginning might be advantageous. For example, having the 400jpg as the first entry might reduce the risk of accidental transmission.
> This is not a requirement but only a consideration that can be applied by the origin

'Surrogate-Variant-Key'
While 'Surrogate-Variant' identifies the key composition and the valid entries, the 'Surrogate-Variant-Key' identifies the current response values used. The key values might be very different than the actual values sent in the request.
. . .
GET /foo HTTP/1.1
Surrogate-Capability: variant;Width;Accept;X-Browser
Width: 250
X-Browser: webp, jpg
. . .
200 OK HTTP/1.1
Surrogate-Variant: Width;201;400;1000, X-Browser;webp;jp2;jxr;jpg;png;gif
Surrogate-Variant-Key: 400, jpg
Content-Type: image/jpg
. . .
Combined, the 'Surrogate-Variant' and 'Surrogate-Variant-Key' response provide two important instructions:
1. How this response_could_satisfy the waiting UA
2. How future requests_should_be formed to extract specific variant responses
In this example, the initiating request, has a Width of 250, yet the actual Width used used for the cache partition is 400. This was an imprecise-request from the surrogate. This request-value and variant-key mismatch can provide a dilemma for the surrogate if the business logic contract is not consistent. Special care may preferably be taken for these scenarios.
> NB: The response from the origin may not be the desired partition sent to the user. The origin may provide a default response when an imprecise initial request is made by the surrogate. The Surrogate may preferably re-evaluate before assuming that the origin's response is intended for the UA.

EXAMPLE SURROGATE-VARIANT DEFINITION

First Response
Most surrogate caches are not able to build a cache entry passively - one response at a time. (Eg: with range-requests) Therefore, we assume that each variant must be a separate cache entry.
The response from the origin, can be detected by the imprecision of the request.
Compare:
...
GET /foo HTTP/1.1
Surrogate-Capability: variant;Accept-Language
Accept-Language: es, en;q=0.8
...
200 OK HTTP/1.1
Surrogate-Variant: Accept-Language:en:he
Surrogate-Variant-Key: en
Content-Language: en
...
With:
...
GET /foo HTTP/1.1
Surrogate-Capability: variant;Accept-Language
Accept-Language: en
...
200 OK HTTP/1.1
Surrogate-Variant: Accept-Language:en:he
Surrogate-Variant-Key: en
Content-Language: en
...
In the first, request, the surrogate is passing along whatever it thinks might be useful-in this case, the requested headers from the UA. In the second example, the surrogate knows that 'es' is not a valid entry and so only requests a precise 'en' value.
On a first response in the Surrogate-Variant handshake (specifically when imprecision is detected), the origin may respond with the safest response. The origin may choose to use the probability of the variants and provide the highest popularity response as the first response.
This mismatch is because most surrogates will have to be re-entrant and restart the request flow even on a cache hit. The origin may assume that the request flow will always be:
...
UA → CDN → (Cache - 1st response) → (Cache - variant response)
...
To avoid the re-entrant nature for the 'majority' of requests, the origin may populate the 1st response with the most popular. For example:
...
GET /foo HTTP/1.1
Surrogate-Capability: variant;Accept-Language
Accept-Language: iu, en
...
200 OK HTTP/1.1
Surrogate-Variant: Accept-Language:en:he
Surrogate-Variant-Key: en
Content-Language: en
...
This will force the Surrogate to evaluate the response as a mismatch and re-request the resource. This time as a more precise entry.
Mismatch Handling
As mentioned, the response from the origin, or from the cache) may not match the request. This can happen in, for example, two scenarios:
1. The response has been recalibrated. (Eg: User requested a 'Width: 250' but a 'Width:400' is the recalibration)
2. The response is not for this UA, but a more popular UA.
The Surrogate cache may preferably continue on.
The surrogate must evaluate the mismatch and determine which of the two scenarios is applicable. If a recalibration, no further processing is required. However, if it is an actual mismatch a restart should be initiated by the surrogate.
...
GET /foo HTTP/1.1
Surrogate-Capability: variant;Width;Accept;X-Browser
Width: 999
X-Browser: webp, jpg
...
200 OK HTTP/1.1
Surrogate-Variant: Width;201;400;1000, X-Browser;webp;jp2;jxr;jpg;png;gif
Surrogate-Variant-Key: 201, jpg
Content-Type: image/jpg
... (restart)

EXAMPLE SURROGATE-VARIANT DEFINITION

```
GET /foo HTTP/1.1
Surrogate-Capability: variant;Width;X-Browser
Width: 1000
X-Browser: webp
...
200 OK HTTP/1.1
Surrogate-Variant: Width;201;400;1000, X-Browser;webp;jp2;jxr;jpg;png;gif
Surrogate-Variant-Key: 1000, webp
Content-Type: image/webp
...
Here you can see the first request had a cache hit (or origin response) with a 201-jpg.
The surrogate re-requested the response, this time using precise attributes in the
header, and returned the 1000-webp to the user.
With most surrogates, unless they are using the 'Surrogate-Tar', it is assumed that
most responses will require at least one restart. Therefore it is also important for the
origin to evaluate the performance offset of a restart compared to a full cache miss.
Some CDNs and Surrogates might have a high cost for a restart in the request flow.
Mismatch avoidance (2nd request)
In a typical scenario the restart should occur when the variant-hit (from cache or from
origin) doesn't match the request. When this happens, the flow will typically be restarted
by the surrogate - this time with precise values of the variant key. In this way, no further
business logic will be necessary.
However, in the event of a cache miss or error on the second request, the surrogate can
optionally send a 404 to the waiting UA or restart once again and this time use the
default response provided originally. This is why it is important that the default response
in a Surrogate-Variant handshake be a wildly acceptable response.
...
GET /foo HTTP/1.1
Surrogate-Capability: variant;Width;Accept;X-Browser
Width: 999
X-Browser: webp, jpg
...
200 OK HTTP/1.1
Surrogate-Variant: Width;201;400;1000, X-Browser;webp;jp2;jxdpg;png;gif
Surrogate-Variant-Key: 201, jpg
Content-Type: image/jpg
... (restart)
GET /foo HTTP/1.1
Surrogate-Capability: variant;Width;X-Browser
Width: 1000
X-Browser: webp
...
404 OK HTTP/1.1
... (restart-2)
GET /foo HTTP/1.1
Surrogate-Capability: variant;Width;X-Browser
Width: 201
X-Browser: jpg
...
200 OK HTTP/1.1
Surrogate-Variant: Width;201;400;1000, X-Browser;webp;jp2;jxdpg;png;gif
Surrogate-Variant-Key: 201, jpg
Content-Type: image/jpg
...
```

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided as organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

The invention claimed is:

1. A computer implemented method of cache key generation, the method comprising:
   receiving from a user a request for content, wherein the request comprises one or more of opening a browser software tab or window;
   launching a software application;
   activating a hyperlink;
   wherein the request causes an electronic communications network connection to be established and/or an HTTP request made; and
   wherein, a surrogate passes the request to an origin, further comprising the origin generating and sending a response to the surrogate, wherein the response comprises indicating whether or not the content is one of a plurality of variations thereof based on n dimensions of variation of the content.

2. A method according to claim 1, further comprising a comparison prior to the generating, the comparison comprising examinations of one or more user traits comprising geographic location, software used to make the request, device used to make the request, absolute time of the request, and relative time of the request.

3. A method according to claim 2, wherein the user traits comprise geographic location comprising a location from where the request was made.

4. A method according to claim 3, further comprising registering a cache hit for overlap in examined traits of a second user making the second request and the first request.

5. A method according to claim 3, wherein the user traits comprise software used to make the request, wherein the software comprises the operating system of a mobile computing device.

6. A method according to claim 2, wherein the user traits comprise the relative time of the request wherein the relative time is assessed in relation to timing relative to an event.

7. A method according to claim 2, further comprising comparing the user traits to known traits and providing a version of the content to the user based on a result of the comparing.

8. A method according to claim 7, wherein the version comprises a stock version of the content.

9. A method according to claim 7, wherein the version comprises a custom version of the content for the user.

10. A method according to claim 2, wherein substantially at the transmission to the end user the variation of the content is extracted.

11. A method according to claim 2, further comprising generating a cache comprising multiple layers wherein between each of the layers there are passive contracts to accommodate variations, wherein each layer comprises one or more variations and wherein each variation comprises one or more rules wherein each rule relates to handling of one or more of the user traits.

12. A method according to claim 2, wherein if the result of the comparison is not an overlap between the user traits and the trait set, the content will be generated based on an approximation of user needs.

13. A method according to claim 1, wherein the electronic communications network comprises a cellular communications network.

14. A non-transitory computer-readable storage medium containing instructions for causing a processor to perform the steps of the method of claim 1.

15. A computer-implemented system arranged to perform the method of claim 1.

16. A method according to claim 1, wherein the response comprises all of the variations.

17. A method according to claim 1, wherein the response comprises a single variation of the content wherein the content is optimized for the user.

18. A method according to claim 1, further comprising a second user initiating a second request for second content.

19. A method according to claim 18, wherein the first and second requests are from the same user.

20. A computer implemented method of content handling; the method comprising:
   (a) receiving a request for content from a user at a surrogate;
   (b) passing the request from the surrogate to an authority;
   (c) providing a response from the authority to the surrogate comprising details of: how many variations of the content are known to the surrogate; and whether or not content for the user is one of the variations;
   (d) an origin responds with either all of the variations, or only the response for the user and provides placeholders for the surrogate to fill in later;
   (e) the surrogate provides to the user the determined version of the content;
   (f) receiving a second request for content from a second user at the surrogate;
   (g) generating a cache hit; and
   further comprising the origin generating and sending a response to the surrogate, wherein the response comprises indicating whether or not the content is one of a plurality of variations thereof based on n dimensions of variation of the content.

* * * * *